No. 673,150. Patented Apr. 30, 1901.
T. WILSON.
STEAM ENGINE.
(Application filed Sept. 14, 1899.)
(No Model.) 6 Sheets—Sheet 1.

No. 673,150. Patented Apr. 30, 1901.
T. WILSON.
STEAM ENGINE.
(Application filed Sept. 14, 1899.)
(No Model.) 6 Sheets—Sheet 2.

Witnesses:
Gustave R. Thompson
Percy C. Bowen

Inventor:
Thomas Wilson,
by Wilkinson & Fisher,
Attys.

No. 673,150. Patented Apr. 30, 1901.
T. WILSON.
STEAM ENGINE.
(Application filed Sept. 14, 1899.)
(No Model.) 6 Sheets—Sheet 3.

Witnesses
Gustave R. Thompson.
Percy C. Bowen.

Inventor:
Thomas Wilson,
by Wilkinson & Fisher
Attys.

No. 673,150. Patented Apr. 30, 1901.
T. WILSON.
STEAM ENGINE.
(Application filed Sept. 14, 1899.)
(No Model.) 6 Sheets—Sheet 4.

No. 673,150. Patented Apr. 30, 1901.
T. WILSON.
STEAM ENGINE.
(Application filed Sept. 14, 1899.)
(No Model.) 6 Sheets—Sheet 5.

UNITED STATES PATENT OFFICE.

THOMAS WILSON, OF HULL, ENGLAND.

STEAM-ENGINE.

SPECIFICATION forming part of Letters Patent No. 673,150, dated April 30, 1901.

Application filed September 14, 1899. Serial No. 730,503. (No model.)

*To all whom it may concern:*

Be it known that I, THOMAS WILSON, a subject of the Queen of Great Britain and Ireland, residing at Hull, in the county of York, England, have invented certain new and useful improvements in engines in which steam or other fluid pressure is transmitted from cylinder to cylinder to be used expansively; and I do hereby declare the following to be a full, clear, and exact description of the invention, such as will enable others skilled in the art to which it appertains to make and use the same.

This invention relates to improvements in multiple-expansion engines in which the steam or motive fluid is transmitted from cylinder to cylinder, said steam after performing work in one cylinder passing on to the next cylinder and working expansively. The preferred type of engine employed is the form having cylinders of gradually-increasing diameters, the smallest receiving the high-pressure steam and the next larger cylinder the exhaust from said cylinder, such action continuing throughout the series of cylinders. The efficiency of this type of engines has been destroyed to a considerable extent by reason of back pressure in the cylinders at certain points in the strokes of their pistons. This back pressure is caused generally by the closing of the exhaust-ports of a cylinder before the piston in that cylinder has completed its stroke, thus causing the piston to compress the confined steam. Another defect in the present system is caused by the opening of the steam-admission valve of one cylinder before the steam has been completely exhausted from the adjoining cylinder, thereby causing the said steam to be compressed when the piston completes its stroke.

The object of this invention is to obviate these disadvantages and to increase the general efficiency of this type of engine. I accomplish such results by employing a novel set of valves for admitting and exhausting the steam from the cylinders at the proper times and conducting the steam that would otherwise be compressed in any cylinder to the next cylinder, where it can be utilized, or if no such cylinder be capable of utilizing said steam it will be exhausted through the low-pressure cylinder, thereby eliminating back pressure and compression within the cylinders.

In order to more fully describe my said invention, reference will be had to the accompanying drawings, in which—

Figure 1:
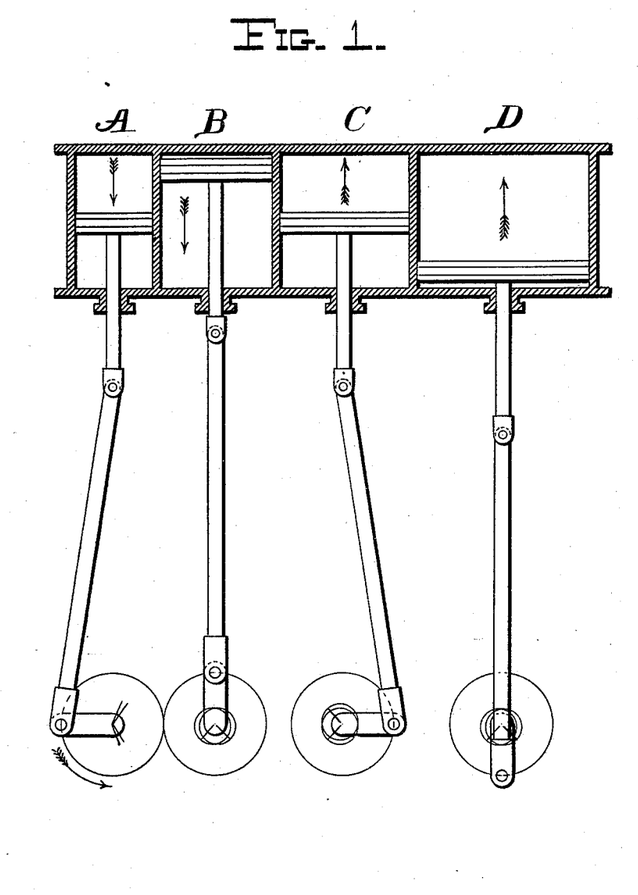
Figure 1 represents in diagram the operating parts of a quadruple-expansion engine.

Referring first to Fig. 1, in which a quadruple-expansion engine is illustrated in diagram, it will be seen that the piston in cylinder A is a half-stroke in advance of the next piston in cylinder B, while the piston in cylinder B is a half-stroke in advance of the piston in cylinder C, and so on through the series. In the ordinary type of engine of this class unless a receiver is employed the exhaust in some of the cylinders is compressed, caused by the closing of the exhaust-valve previous to the admission of live steam to drive the piston on its return stroke. In most engines of this class the exhaust from the high-pressure cylinder is exhausted into the next cylinder, sometimes being admitted at a time when the piston in said cylinder would compress the inflowing steam, the result being a considerable back pressure upon the pistons of both cylinders. This is obviated in the present invention, as all back-pressure steam unable to be utilized in the next cylinder is passed on to the first cylinder having its piston moving in the proper direction, or it may be exhausted from cylinder to cylinder through the open valves and finally escape from the exhaust-port of the low-pressure cylinder.

Referring to Figs. 2 to 6, inclusive, these figures represent a compound-expansion engine constructed in accordance with my invention. In these figures A is the high-pressure cylinder, which receives the steam at boiler-pressure, and B is the low-pressure cylinder of larger diameter, adapted to utilize the exhaust-steam from cylinder A. Working within each of these cylinders are pistons of the ordinary type. Leading from the piston-chamber of cylinder A are two separate sets of steam-ports—viz., $a'$ $a^3$ and $a^2$ $a^4$. Located above the ports $a'$ $a^3$ and in communication therewith is the valve $b^2$. This valve $b^2$ is of the piston type and is adapted to be adjusted so as to vary the cut-off of steam to said cylinder. Located above the ports $a^2$ $a^4$ and in communication therewith is the valve $b'$, having a constant cut-off. Both the constant-cut-off valve $b'$ and the variable-cut-off valve $b^2$ are in communication with the source of steam-supply. Leading from the chamber containing the variable-cut-off valve $b'$ are exhaust-ports $c'$ $c^3$, the port $c'$ communicating with a chamber $d'$ within the casing $d$ and the port $c^3$ communicating with another chamber $d^2$ of said casing. Leading from the chamber containing the constant-cut-off valve $b'$ are the exhaust-ports $c^2$ $c^4$, the port $c^2$ leading into the chamber $d'$ of the casing $d$ and the port $c^4$ into the chamber $d^2$. Above the casing $d$ and surrounding the same is the steam-chest $f$, having a dividing-partition $f^5$, separating the same into two compartments $f'$ and $f^2$. Mounted within the casing $d$ is a valve $e$, adapted to oscillate, said valve being provided with two separated transverse ports $e^5$ $e^6$, the port $e^5$ being above and communicating with the ports $c^2$ $c^4$ and the port $e^6$ above the ports $c'$ $c^3$. Within the casing of said valve $e$ are ports $e'$ $e^3$, adapted to register with the port $e^5$ when the latter is horizontal, and ports $e^7$ $e^8$ to register when the said port $e^5$ is vertical. At the opposite end of said valve $e$ and adapted to register with the port $e^6$ are the ports $e^2$ $e^4$ horizontally disposed and ports $e^9$ $e^{10}$ vertically disposed. Communicating with the chamber $f^2$ of the valve-chest $f$ is the exhaust-opening $g^2$, leading to the forward end of the cylinder B, and communicating with the chamber $f'$ is a similar opening $g'$, which leads to the rear end of cylinder B, the change-valve of the high-pressure cylinder A serving to admit steam to cylinder B. $k$ is a passage leading from the source of steam-supply to the space above the said valve $i$, the purpose being to convey steam above said valve to retain it upon its seat when a valve of the D type is employed. This is necessary in order to overbalance the pressure tending to raise the valve off its seat caused by the exhaust-steam passing beneath said valve while passing from the cylinder and also to withstand the pressure in the cylinder when closed. After the steam has passed into the last cylinder it is allowed to pass off by the valve $i$ through the passage $h^3$, which is preferably connected to a condenser, or may simply exhaust into the atmosphere.

Figure 2:
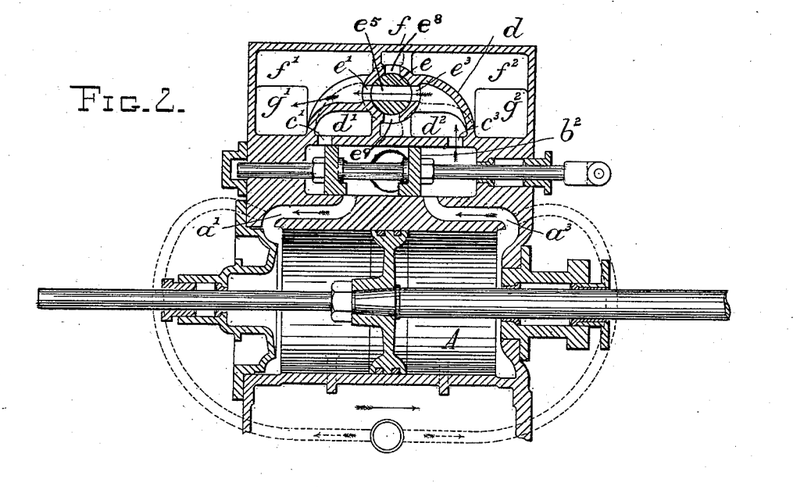
Fig. 2 represents a longitudinal section of the high-pressure cylinder on the line $xx$ of Fig. 4, the valves being shown as a section on the line $xxxx$ of Fig. 3.
Figure 3:
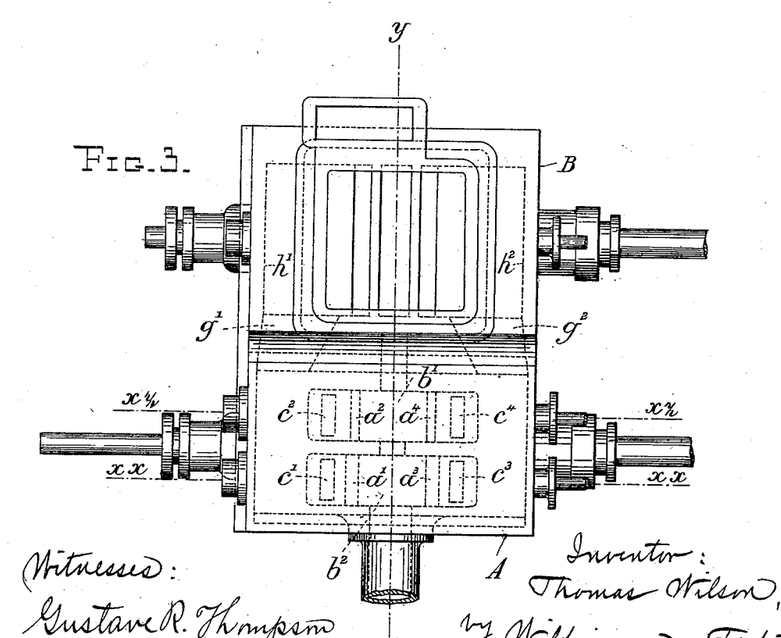
Fig. 3 is a plan view of the high and low pressure cylinders of a compound engine.
Figure 4:
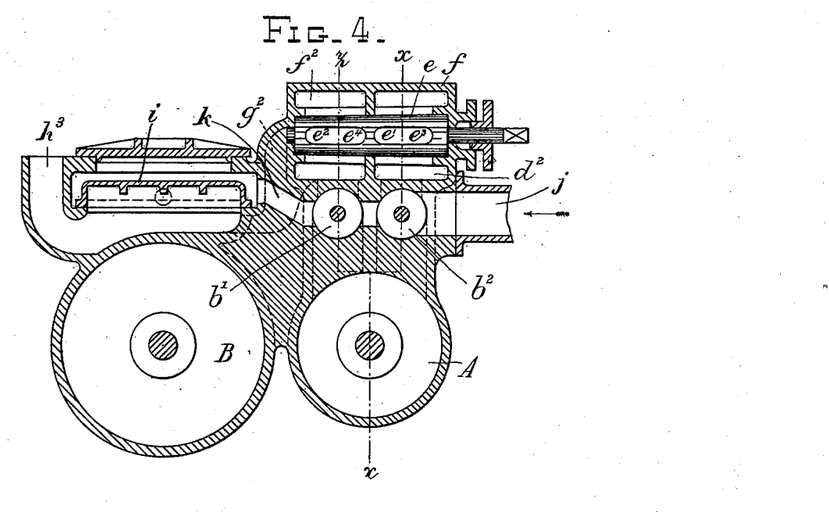
Fig. 4 is a transverse section along the line $yy$, Fig. 3.
Figure 5:
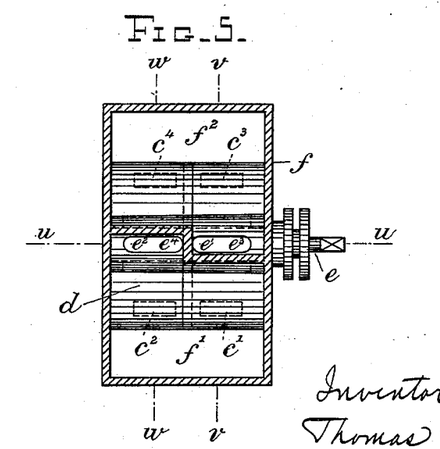
Fig. 5 is a sectional view of the change-valve.
Figure 6:
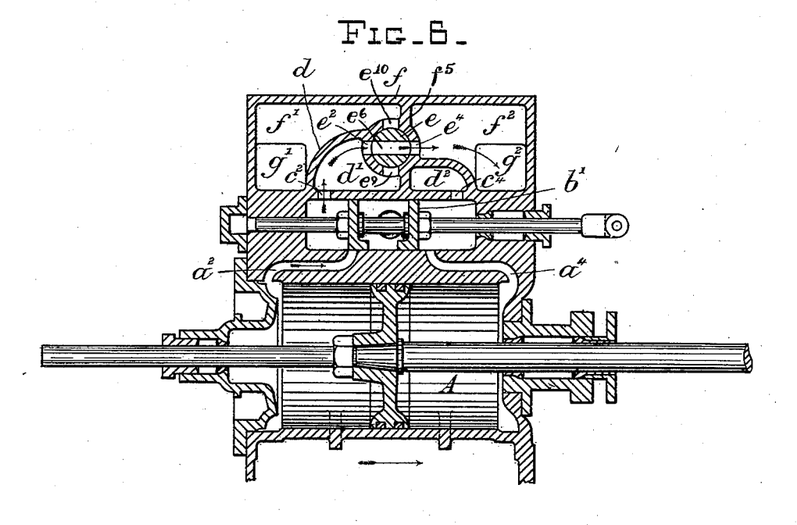
Fig. 6 is a section taken along the line $xz$ of Fig. 4, the section through the valve being taken upon the line $xzxz$, Fig. 3.
Figure 7:
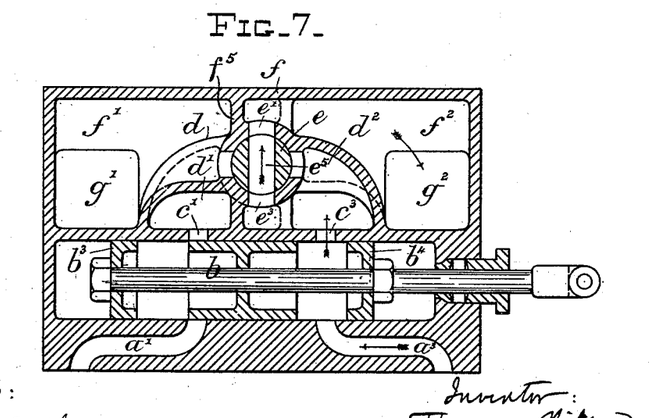
Fig. 7 is an enlarged longitudinal sectional view of the piston and change-valves for the intermediate cylinder.

In Fig. 7 is shown a valve somewhat modified from that shown in Figs. 2 and 6. In order to balance the valve against steam-pressure, the disks $b^3$ $b^4$ are placed at each end of the valve.

Figure 8:
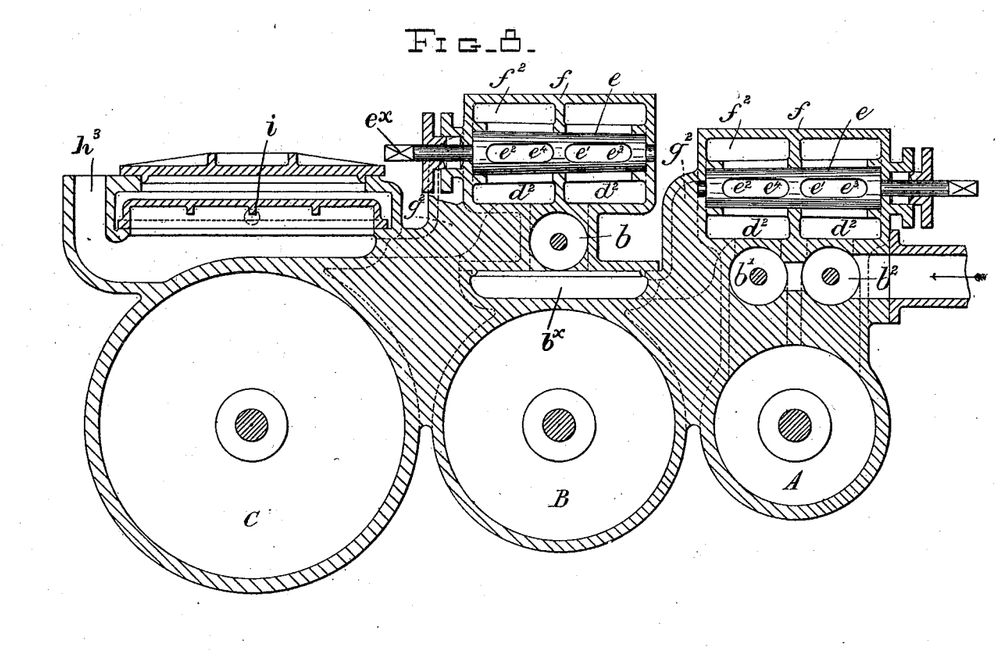
Fig. 8 is a transverse section through the valves and cylinders of a triple-expansion marine engine constructed in accordance with my said invention.

In Fig. 8 is illustrated a triple-expansion engine. In this type the high-pressure cylinder and valves are similar to the corresponding cylinder of the compound engine shown in Figs. 2 to 6, inclusive, the cylinder being provided with a variable and a constant cut-off valve. The intermediate cylinder employs a valve such as illustrated in Fig. 7. In this case a constant-cut-off valve $b$ only is employed, the change-valve being the same as for the high-pressure cylinder. The exhaust from the change-valve of the high-pressure cylinder passes into the chamber $b^\times$ beneath the valve $b$, one of the chambers being at each end of the intermediate cylinder and communicating with that side of the piston, the change-valve of the high-pressure cylinder serving as the admission-valve for the intermediate pressure-cylinder. In like manner the change-valve of the intermediate cylinder is the steam-controlling valve for the admission of the exhaust-steam from the intermediate cylinder to the cylinder C, the valve $i$ simply exhausting the steam therefrom at the proper time.

Figure 9:
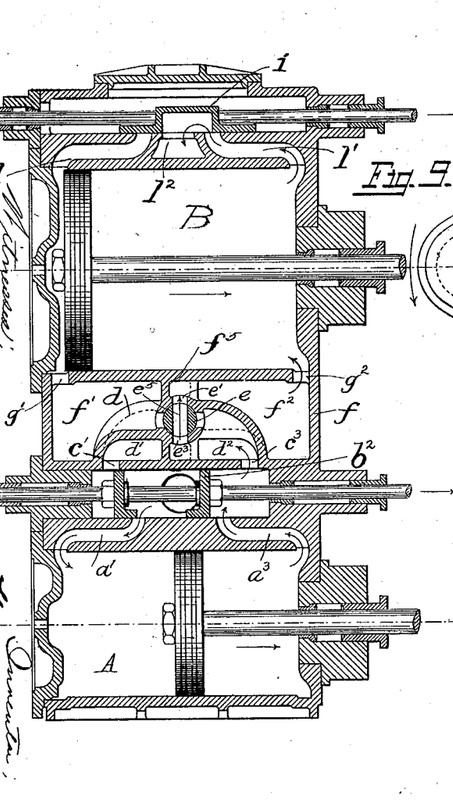
Fig. 9 represents a longitudinal section through the cylinder and valves of a compound engine, the section through the valves of the high-pressure cylinder showing the variable-cut-off admission-valve.
Figure 10:
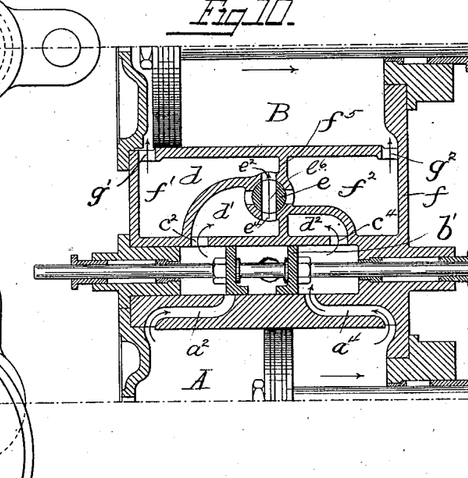
Fig. 10 is a similar section, the section through the valves showing the constant-cut-off admission-valve of the high-pressure cylinder.

Figs. 9 and 10 are sections through the valves and cylinders of a compound engine, Fig. 9 showing the variable-cut-off valve, and Fig. 10 the constant-cut-off admission-valve for the high-pressure cylinder. In these views the piston in cylinder A has traveled one-half its stroke under approximately full steam-pressure, the constant-cut-off valve $b'$ having supplied steam during a portion of its stroke and the variable-cut-off valve $b^2$ just being in the act of closing, steam still passing into the cylinder A through this valve. During the time this piston was traveling over the half-stroke the piston in cylinder B was traveling from the middle of its cylinder toward the back thereof in a direction opposite to that of the piston of the high-pressure cylinder. The exhaust-steam from the forward side of the high-pressure piston was passing, as shown by the arrows, through ports $a^3$ and $c^3$ into the chamber $d^2$ of casing $d$. From thence it passed through the change-valve $c$ by ports $e'$ $e^3$ into the chamber $f^2$, passing from there by the port $g^2$ into the cylinder B behind the moving piston. As the piston in cylinder B has now completed its stroke, the pressure of steam upon the forward side of this piston must cease in order to prevent any back pressure when the piston begins its return stroke. At the moment when the piston in this cylinder B reaches the end of its stroke the exhaust-valve $i$ has opened, which permits the exhaust still exhausting from cylinder A and from cylinder B to escape in one volume, the exhaust passing directly through cylinder B from port $g^2$ to port $l'$ at a very low or practically zero pressure. The change-valve $e$ during this time has remained in one position. As the piston in cylinder B is about to commence its return stroke pressure must be applied to the rear of said piston. Referring to Fig. 10, it will be seen that the valve $b'$ has traveled a portion of its return stroke and has partly opened the port $a^2$, allowing the steam at high pressure to escape from behind the high-pressure piston. This steam passes by way of ports $c^2$ $e^4$ $e^2$, chamber $f'$, and through port $g'$ into the rear end of the low-pressure cylinder. As the valve $i$ covers the port $l$ at this end of the cylinder, the steam now passing into said cylinder from the high-pressure cylinder will be confined until the completion of the stroke of said piston, when it will be exhausted. In order to prevent the pressure of the steam in cylinder A from decreasing to an excessive extent, owing to this simultaneous use of the steam, the variable-cut-off valve $b^2$ may be so set that the steam is not cut off from the high-pressure cylinder until its piston has passed through the greater portion of its stroke, as shown in Fig. 9. During the remainder of the stroke of the high-pressure piston the variable-cut-off valve $b'$ closes the port $a'$ from communication with the source of steam-supply and is ready to open said port to exhaust the steam from its side of the cylinder. The valve $b'$ has opened the port $a^2$ completely for exhausting. It will be seen that by this arrangement the sudden rush of steam at the opening of the exhaust-valve of cylinder A into cylinder B will find the piston in cylinder B at the beginning of a stroke, thereby acting at the most desirable point in the stroke of said piston and incidentally avoiding all strain upon the cranks and working parts. The cycle of operations is precisely the same during each complete revolution of the driven shaft to which the working parts are connected, the exhaust-valve $i$ traveling about a half-stroke in advance of the piston in cylinder B, the steam-admission valves $b'$ $b^2$ traveling about a half-stroke behind the high-pressure piston.

In the triple-expansion engine the action of the steam is substantially the same as in the compound expansion-engine previously described, the high and low pressure cylinders being the same as the corresponding cylinders, the valve mechanism for the intermediate cylinder being somewhat different in construction. Instead of having two valves, such as $b'$ $b^2$ of the high-pressure cylinder, only one of such valves $b$ is employed, the valve being somewhat modified in construction. In this engine the exhaust from the change-valve $e$ of the cylinder A acts as the steam-admission valve for the cylinder B, each port leading from said change-valve leading directly to and communicating with one end of cylinder B at $b^\times$. The valve $b$ retains or exhausts the steam from cylinder B at the proper times into the change-valve $e$ above it, this change-valve being provided with ports, one of which leads directly to each end of the low-pressure cylinder C. The valve $i$ of this cylinder corresponds to the valve $b$ of cylinder B; but instead of a piston-valve a plain D or slide valve is employed, such a valve being found most desirable in this instance. In order to reverse the engine, the various valves are shifted by the reversing-gear in the usual manner, the valve $e$ being rotated one-quarter revolution, such a movement of the said valve causing the relation between the ports of the contiguous cylinders to be reversed. The mechanism for reciprocating the valves $b$, $b'$, $b^2$, and $i$ may be of the usual form.

Although I have shown the high-pressure cylinder in the triple-expansion engine provided with a pair of steam-admission valves, it is obvious that only one of such valves might be employed, if desired, in which case the valve illustrated in Fig. 2 is preferable. In such an instance it must be so constructed as to separate the exhausts—that is, to discharge the exhausts from different ends of the cylinder into separate cells in the casing $d$—and to have its lap adjusted to admit steam to about fifty-five to seventy per cent. or about two-thirds of the stroke, with clearance sufficient to commence exhausting therefrom at about two-thirds of the stroke or just as the piston in cylinder B is on the turn of its stroke.

In the quadruple-expansion engine the only point of difference is that instead of having one intermediate cylinder two are employed, (of different sizes,) the valve mechanism being the same as that used upon cylinder B, Fig. 8. In the quadruple-expansion engine the cranks of each cylinder bear the same relation to one another as in the compound engine. Therefore the valves are set the same, which will be understood upon referring to Figs. 9 and 10.

It is to be understood that I do not limit myself to the precise details as herein described and as illustrated in the accompanying drawings, believing myself to be the first to propose the construction of an engine in which the steam is passed from cylinder to cylinder in a way which enables the steam exhausted from one cylinder to be used expansively in the next of the series without setting up back pressure in either of the cylinders or leaving steam to be compressed in any of the cylinders.

It is obvious that many modifications may be made in the details herein shown without departing from the spirit of my invention, the essential features of said invention being the action of the steam in the various cylinders and the mechanism for controlling the same.

Having thus described my invention, what I claim, and desire to secure by Letters Patent of the United States, is—

1. In a compound steam-engine, the combination with the cylinders and their pistons and ports; of an admission-valve for the high-pressure cylinder having a constant cut-off mounted above and having ports communicating with said cylinder, and a variable-cut-off valve mounted above said cylinder beside said constant-cut-off valve also having ports communicating with said high-pressure cylinder, substantially as described.

2. In a compound expansion-engine, the combination with the high and low pressure cylinders and their pistons and ports; of mechanism for admitting steam to said high-pressure cylinder, and means whereby the communication between the exhaust-ports of the high-pressure cylinder and the steam-admission ports of the low-pressure cylinder may be reversed, substantially as described.

3. In a compound expansion-engine, the combination with the high and low pressure cylinders and their pistons and ports; of a valve mechanism comprising steam-admission valves for the high-pressure cylinder, and a valve-casing above said admission-valves, and a valve mounted in said casing for controlling the inlet of exhaust-steam to the low-pressure cylinder, substantially as described.

4. In a compound engine, the combination with each cylinder and its piston and ports; of a steam-chest mounted above said cylinders, provided with ports leading to its respective cylinder, steam-admission valves mounted in said steam-chest in communication with said ports, an oscillating valve mounted above said valves, a valve-casing surrounding said oscillating valve, cells within said casing communicating with said admission-valves, ports connecting said cells with said oscillating valve, and compartments formed in said steam-chest, said oscillating valve forming communication between the cells within said casing and the compartments in said steam-chest, substantially as described.

5. In a compound engine, the combination with each cylinder and its piston and ports; of a valve mechanism therefor comprising one or more admission-valves, and a change-valve mounted above said admission-valve, and passages leading from said change-valve to each end of the adjacent cylinder, whereby a partial rotation of said change-valve reverses the relation between said ports to the ports of the adjacent cylinder, substantially as described.

6. In a compound expansion-engine, the combination with two cylinders of different diameters, and their pistons and ports; of a valve mechanism therefor comprising a pair of admission-valves for the cylinder of smaller diameter, and a valve located between said admission-valves and the cylinder of larger diameter, whereby a partial rotation of said latter valve reverses the relation between the ports of the two cylinders, substantially as described.

7. In a compound expansion-engine, the combination with the high and low pressure cylinders, and their pistons and ports; of admission-valves located adjacent to and in communication with the ports of said high-pressure cylinder, and a change-valve casing provided with separated cells, each cell being adapted to receive the exhaust from one side of said high-pressure cylinder, and a change-valve mounted to rotate in said casing, the rotation of said change-valve placing each of said cells into communication with each side of the low-pressure cylinder, the next rotation of said valve reversing the relation between said compartments and said cylinder, substantially as described.

8. In a compound expansion-engine, the combination with the high and low pressure cylinders, and their pistons and ports; of a valve mechanism comprising a constant-cut-off valve for admitting steam to said high-pressure cylinder, and a variable-cut-off valve also for admitting steam to said cylinder, and means whereby the communication between the exhaust-ports of the high-pressure cylinder and the steam-ports of the low-pressure cylinder may be reversed, substantially as described.

9. In a compound engine, the combination with a plurality of cylinders of different diameters, and pistons adapted to work in said cylinders, all of said pistons being connected to a common crank-shaft; of valve mechanism for said cylinders comprising a reciprocating piston-valve and an oscillatory reversing-valve mounted above each of said piston-valves, the low-pressure cylinder being provided with a plain slide-valve, said oscillatory valve controlling the admission of steam from the cylinder below it to the next larger cylinder, substantially as described.

10. In a compound engine, the combination with a plurality of cylinders of different diameters, and pistons adapted to work in said cylinders, all of said pistons being connected to a common crank-shaft; of valve mechanism for said cylinders comprising a valve-chest for each of said cylinders, admission-valves for the high-pressure cylinder, an oscillatory valve mounted above said admission-valve for admitting steam to the adjacent cylinder, a similar valve in each succeeding cylinder for controlling the supply of steam to the next larger cylinder, and an exhaust-valve for the low-pressure cylinder, substantially as described.

11. In a compound expansion-engine, the combination with the high and low pressure cylinders and their pistons and ports; of a valve mechanism comprising admission-valves for the high-pressure cylinder, a valve-casing located above said admission-valves, cells formed in said valve-casing, said cells being in communication with the valve-chamber of said admission-valves, and a rotatable valve mounted in said valve-casing, adapted to alternately place each of said cells in communication with the steam-admission ports of the low-pressure cylinder, substantially as described.

12. In a compound expansion-engine, the combination with the high and low pressure cylinders, and their pistons and ports; of admission-valves for said high-pressure cylinder, a valve-casing located above said admission-valves, cells formed within said casing, each of said cells being in communication with one side of said high-pressure cylinder through the admission-valves, a rotatable valve mounted in said casing, a steam-chest surrounding said valve-casing, said chest being divided into two compartments, each having communication with one side of said low-pressure cylinder, the rotation of said valve causing the communication between the said cells and compartments to be reversed periodically, substantially as described.

13. In a compound engine in which steam is used expansively from cylinder to cylinder, the combination with the cylinders, and their pistons and ports; of a valve mechanism for said cylinders comprising one or more piston-valves in communication with the ports of the adjacent cylinder, and mechanism for periodically reversing the communication between the ports of one cylinder and those of its adjacent cylinder, substantially as described.

14. In a compound engine in which steam is used expansively from cylinder to cylinder, the combination with the cylinders and their pistons and ports; of valves mounted directly above each of said cylinders for controlling the passage of steam through the ports of said cylinder, a valve-casing mounted above said valves, cells formed within said valve-casing, said cells being in communication with the ports of said cylinder through said valves, a valve rotatably mounted within said casing, a steam-chest surrounding said valve-casing, and a partition dividing said steam-chest into two compartments, each of said compartments being in communication with one of said cells of said valve-casing through said rotatable valve, substantially as described.

In testimony whereof I affix my signature in presence of two witnesses.

THOMAS WILSON.

Witnesses:
EDWARD THOMAS ELCOAT,
JOSEPH EDWARD LOFTHOUSE.